No. 684,855. Patented Oct. 22, 1901.
J. L. OWENS.
GRAIN SEPARATING MACHINE.
(Application filed Aug. 21, 1897.)
(No Model.) 2 Sheets—Sheet 1.
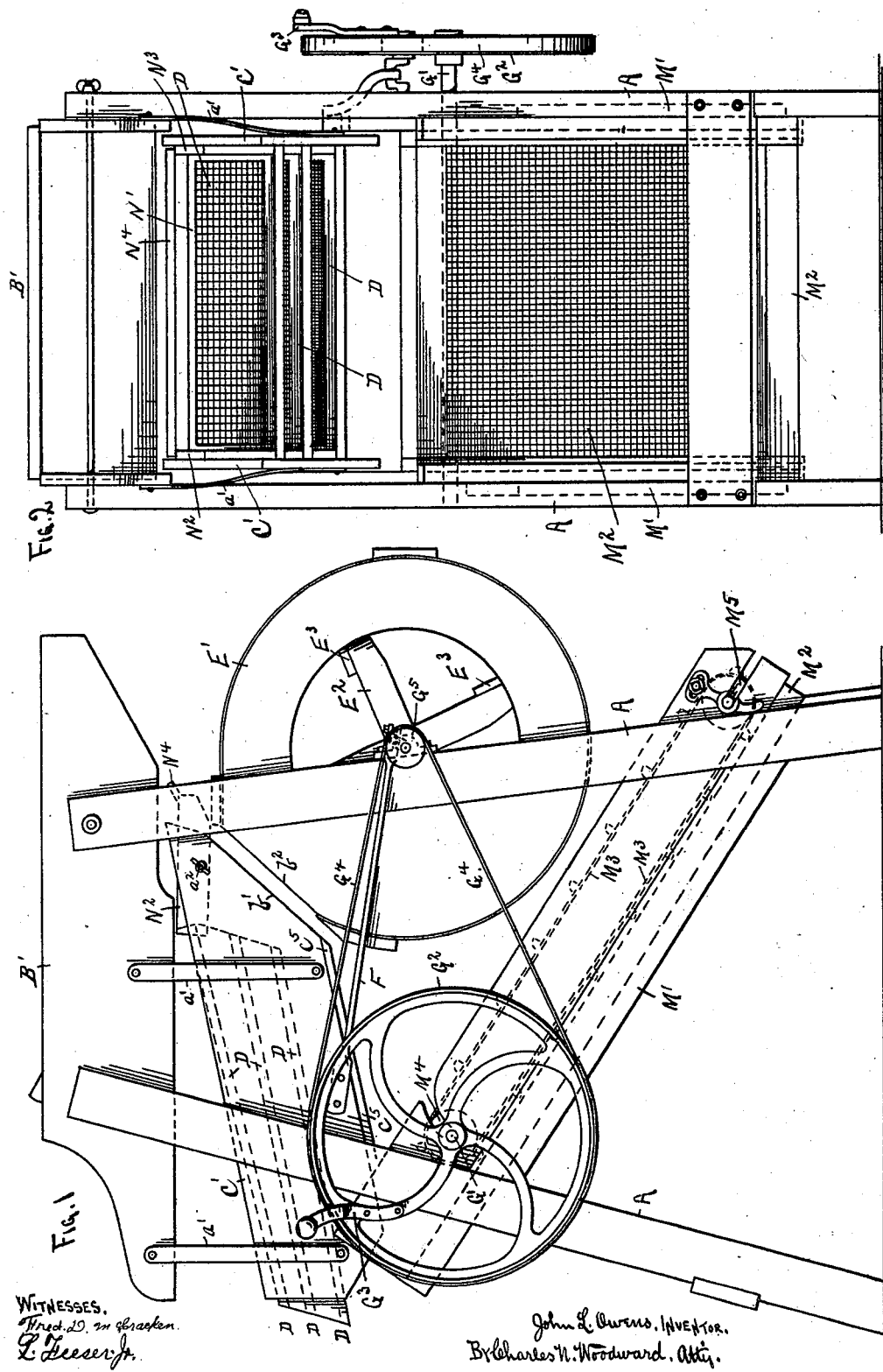

No. 684,855. Patented Oct. 22, 1901.
J. L. OWENS.
GRAIN SEPARATING MACHINE.
(Application filed Aug. 21, 1897.)
(No Model.) 2 Sheets—Sheet 2.
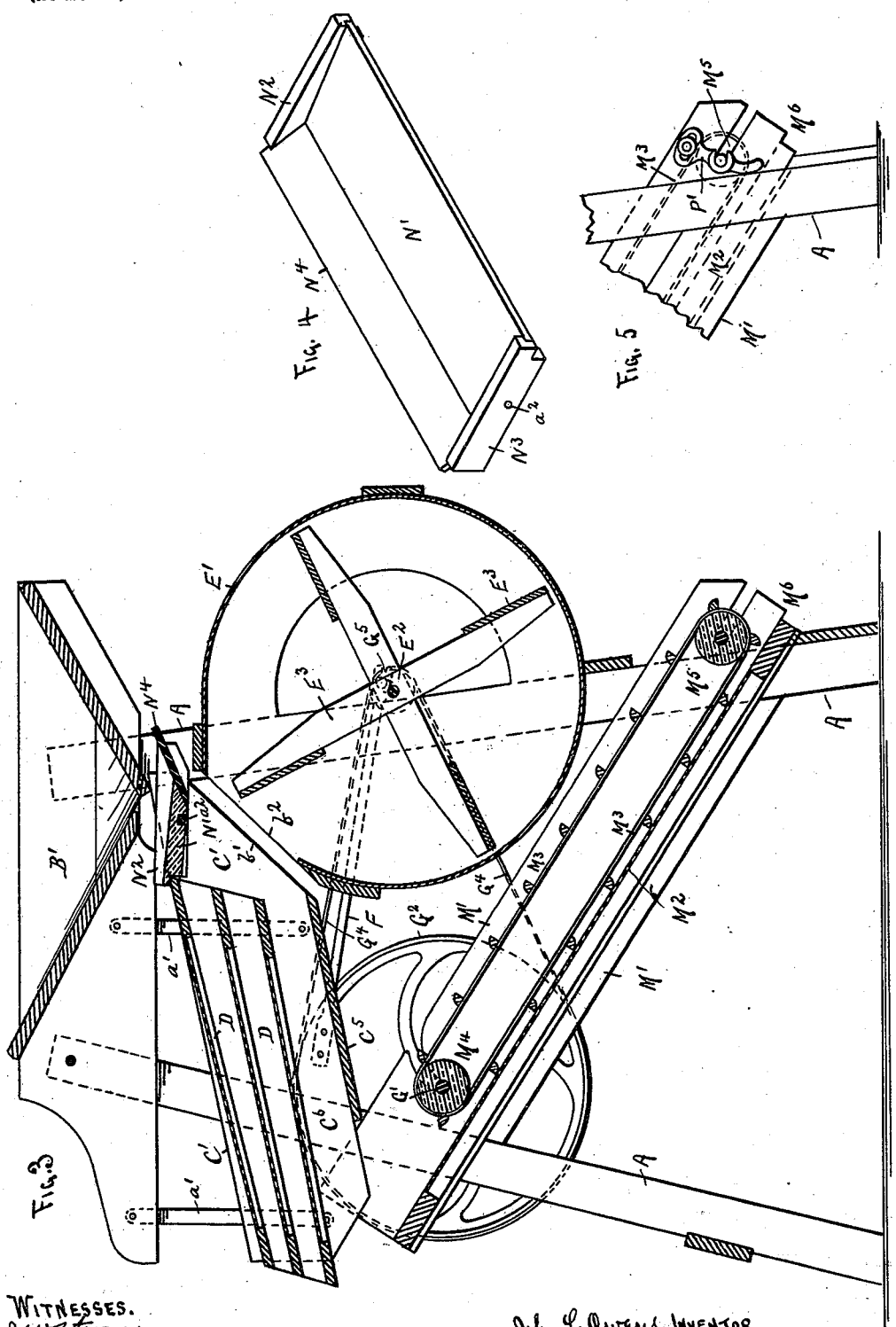

UNITED STATES PATENT OFFICE.

JOHN L. OWENS, OF MINNEAPOLIS, MINNESOTA.

GRAIN-SEPARATING MACHINE.

SPECIFICATION forming part of Letters Patent No. 684,855, dated October 22, 1901.

Application filed August 21, 1897. Serial No. 648,984. (No model.)

*To all whom it may concern:*

Be it known that I, JOHN L. OWENS, a citizen of the United States, residing at Minneapolis, in the county of Hennepin, State of Minnesota, have invented certain new and useful Improvements in Grain Separators and Cleaners, of which the following is a specification.

This invention is intended to be employed for preparing wheat for use as seed; and to that end it is designed to thoroughly separate all kernels of grain other than the wheat, as well as the smaller imperfect kernels of the wheat, from the plumper perfect kernels and also to separate the deleterious seeds and chaff, sticks, sand, and other foreign matter, leaving only the perfect wheat-berries in the final receptacle.

The invention is more specifically intended to separate cockle-seed from seed-wheat, cockle-seed being the most difficult seed to separate from wheat, and experience has shown that to properly separate the cockle all other deleterious seeds, as well as all foreign matter, must first have been separated from the fuller, plumper, and perfect wheat before the final separation of the cockle from the wheat can be effectually accomplished.

The object of the invention is to produce a machine which will thus effectually separate all seeds other than the full perfect wheat-berries, as well as all foreign matter, from the cockle and wheat and then separate the cockle-seeds from the perfect wheat-berries.

The present mechanism embodies improvements upon machines of the sort shown in my earlier patent, No. 384,002, dated September 4, 1888. The mechanism in that patent contained an upper vibrating shoe and a fan and at the bottom a supplemental separator having an inclined perforated grain-floor with a retarding-belt above it, the inclination of the floor being such that the grain-berries were caused to roll downward thereon, the speed of the belt being such that the transverse cleats would partially stop, check, or retard the berries and compel them to retain their transverse positions and continue their downwardly-rolling motion and the perforations in the floor being such that the short rounder berries and broken wheat-kernels could drop therethrough, while the longer perfect ones were held up and finally delivered at the bottom. To the machine in my earlier patent there were a number of disadvantages which it is the purpose of the present device to overcome.

In the earlier construction the grain was not carried directly from the upper winnower-shoe to the retarding-belt and perforated floor, but was subjected to the operation of intervening mechanism—to wit, a peculiar dragging and sifting device having a perforated screen-floor and a flexible fabric arranged to press upon the upper surface of the floor, the intention being to have the fabric turn the berries or longer seeds to lines longitudinal of the lines of travel. This intermediate dragging-screen was principally intended for the removing of oats; but in practical use it has been found that while such a mechanism was advantageous under some circumstances it is under others liable to cause loss of desirable seeds. In treating wheat, for instance, of the sort whose berries are relatively long it is difficult to produce a perfect separation between the wheat and the oats if dependence is placed upon the length of the seeds. Hence I here employ a different method of separation and so dispose the parts of the upper element (the fan and the winnower-screen) and so adjust the strength and direction of the blast that I remove the oats in that part of the mechanism, leaving the other element (the lower supplemental separator) to act upon the principle of difference in shape. Again, in my earlier construction the intervening oat-separator just referred to acted in such way as to deliver the grain to the top side or upward-moving side of the lower apron or retarding-belt; but as this belt must necessarily be at a steep inclination difficulty was experienced in that the grain dropping upon its upper or upward-moving leg was not properly guided and carried upward, and there was liability for it to escape downward by bounding or otherwise. In the present machine I deliver the material which passes through the upper screen directly to the space between the upper roll of the retarding-belt and the perforated steeply-inclined floor below it, and I insure that the only seeds which have any material elongation and which come in contact with the lowermost screen are the wheat-berries, the other relatively long seeds, such as oats, being removed by the screening and blast mechanism, only the heavier ones being allowed to drop, such as the wheat and the cockle.

It is true I preserve a number of the advantages incident to my earlier mechanism, such as this, that the fan and the shoe-screens are so related to each other that the jets or blasts of air are not all carried upward and largely forced vertically through the screens in the way almost universally common in grain-winnowers. I employ an overacting fan, as I did in my earlier machine, both differing in that respect from the previous art, this fan having a casing or drum which is almost entirely continuous around the circle, it having a narrow air-exit near the top, through which the air is projected on practically horizontal lines, the screens being so arranged that the air travels approximately parallel to them.

The present invention further relates to improvements in the construction of the fan casing or drum, the shoe, the arrangement thereof relative to the fan, and the arrangement therein of the screens and also improvements in the means for connecting together the two differently-acting separators and the parts thereof, so that the feed of the material shall be accurately regulated and so that the speed of the parts and of the feed shall be kept practically constant under the action of a balancing and momentum device, all of which will more fully appear from the description below.

Figure 1 is a side elevation of a separator embodying my improvements as seen from the power side. Fig. 2 is an elevation from the rear end. Fig. 3 is a vertical longitudinal section. Fig. 4 is a perspective view of the feed-board detached. Fig. 5 is a view of the tension mechanism of the cockle-separating belt.

The mechanism is supported by legs A, with the feed-hopper B' at the upper part, as shown. Beneath the feed-hopper is suspended by parallel bars $a'$ a shoe C', containing a series of inclined screens D, the inner or rear open end $b'$ of the shoe being angularly formed and corresponding to the angularly-formed mouth or discharge end $b^2$ of the fan-casing E', so that the blast from the fan $E^2$ will be conducted in an upwardly-slanting direction against the upper imperforate ends of the screens D and by them deflected along the lower surfaces of the screens and parallel thereto, as shown. It will be noted, as above stated, that the outlet $b^2$ of the fan-case E' is inclined and that the fan-case projects partially beneath the inner or upper correspondingly-inclined end $b^2$ of the shoe C', so that the distance between the fan-blades $E^3$ and the screens D is minimized, whereby the blast is directed more directly into the spaces between the screens and leaving the shortest possible interval of space between the fan-blades and the screens against which the blast generated by them acts. By the inclined positions of the two adjacent parts $b'$ $b^2$ the fan-case is brought forward beneath the shoe and the blast conducted upward at an angle against the imperforate ends of the screens and thence deflected along beneath the screens and parallel thereto, so that none of the air-currents are driven directly upward through the screens, but first expend their force against the particles of material falling through the screens and acting upon them at right angles to the flow of the material. The blasts of air, therefore, do not disturb the material upon the screens to a deleterious extent, as the only air which passes upward through the screens is the small quantity which finds its way indirectly from between the screens. This is a very important feature of my invention, as it enables me to secure the best possible results by effectually removing all the lighter particles, which the blasts of air will carry off, and leave the heavier particles only to pass through the screens D and be discharged over the "tails" of the screens. In the relative arrangement and construction of the screens and the fan there are marked improvements over my earlier mechanism. Therein I employed a relatively-elongated duct or trunk between the shoe-screens and the blast-fan, the result being that the power of the air-blast was materially reduced in passing through the duct or trunk prior to reaching the materials on the screen. In the present machine it will be seen that I not only dispense entirely with the duct or trunk, but, in fact, form the air-exit by cutting off part of the cylinder of the fan-drum or casing and then bring the shoe and its screens close to the circle of the fan-blades, as above described, so that the currents or blasts of air are available to their full efficiency. Another result obtained by having the different inclinations of the shoe-screens is that upon the second and third screens I maintain a practically uniform distribution of the material and a corresponding uniform resistance to the air at all points on both of them. The lower screen is approximately tangential to the circle of the fan-blades, while the second and third screens above are tangential to larger circles, and therefore there is a tendency gradually increasing upward for the air to impinge on the screens transversely and for some of it to pass vertically through them. Hence a relatively large mass of lighter foul material is carried off from the upper screen, a somewhat smaller mass from the second one, and the least of all from the lower one, and the wheat-berries travel gradually slower and slower, as is desirable, there being a gradual decrease in the mass of foreign material that remains and an increase in the quantity of grain per inch. In this respect my screening and winnowing mechanism differs from most of the earlier grain-winnowing machines. The latter were designed to effect the entire separation (or as much thereof as possible) by the air-blast, which was directed not only against those screens that were above the axis of the fan, but even against the final inclined bottom screen, which is located below the fan-axis; but one of my purposes is to effect the principal separation through differences in shape, and the air-blast and screening are to be regarded merely as a preliminary cleansing step. I prevent the blast from impinging upon the grain after it has reached the lower screen, as such action would fatally interfere with the peculiar mode of operation thereof and of the retarding-conveyer. To do this, I carry the casing or drum of the fan up to a high line, so as to shield the lower separator from the action of the air, and arrange the gathering-board $C^5$ so that it shall serve as a fender, it lying in a plane above the upper end of the lower screen. It will also be noted that the screens gradually decrease in horizontal angle from their "head" ends toward their "tail" ends, whereby two very important results are produced: First, the screens become flatter or more nearly horizontal from the coarser upper screens toward the finer lower screens, thereby insuring a more complete and perfect action, as the finer the material to be separated becomes the less of an incline is required to the screens. The screens therefore being gradually decreased in inclination from the coarser toward the finer and the material passing through them correspondingly increasing in fineness, the action of the air-blast is correspondingly uniform and regular and effectually removes all the lighter particles of deleterious matter without disturbing the material which it is desired to separate by means of the screens. Another advantage gained by this gradually-decreasing inclination of the screens is that the spaces between the screens are correspondingly gradually decreased, so that the spaces are gradually contracted from the head toward the tails of the screens, whereby the air-blasts are somewhat retarded and caused to act with a greater effect upon the particles to be carried off by them and giving the heavier particles a better opportunity to be precipitated upon the next screen below. These are two very important functions of the screens as arranged in my machine and are very effective in separating all the kernels of seeds other than the wheat and cockle, as well as the foreign matter which is mingled with the wheat.

The seeds, deleterious and otherwise, found mingled with the wheat are oats, cockle, wild buckwheat, wild mustard, wild peas, millet, timothy, and other grass-seeds and clover, as well as the particles of chaff, small sticks, sand, and other foreign matter. All of these "foreign" seeds are also found mingled with the oats, barley, rye, and other grains. These various foreign seeds, as well as the other foreign matter, being of different sizes or shapes and weights, require different agencies to remove them, and these different agencies must be very delicately arranged and controlled, so as to act upon the various particles without affecting the other particles. Some kinds of foreign seeds, for instance, can best be separated by a delicately-adjusted air-blast; but this air-blast must be so arranged that it will not affect another kind of seed, which may require a peculiarly-arranged and peculiarly-inclined screen to properly separate them. Then, again, some kinds of seed may require a peculiar form or inclination of a screen and a peculiar manipulation of the grain while passing over the screen and at the same time be protected from any influence from the air-blasts or other elements of the apparatus. I have endeavored in the arrangement of this apparatus to meet all these various conditions and combine in one machine means for completely separating all the various seeds, both valuable and deleterious, from the wheat, as well as the foreign matter of all kinds. As before stated, cockle-seed are the most difficult of all seeds to separate and require a distinctive treatment, and require also to be treated alone with the wheat, as before described. By the arrangement above noted, the upper screen D being coarse and set at a steeper incline than the other screens in the shoe $C'$ will allow the finer particles to readily pass through and fall upon the next screen. These finer particles are the cockle, grass-seeds of various kinds, wild mustard, wild pea, buckwheat, &c. As the material falls through the upper screen D it passes through the air-blast in the fan $E^3$, and the lighter particles are thereby picked off and carried off over the tail of the screen and the heavier particles only fall upon the next screen. These particles being finer than those falling upon the first screen would flow faster down a screen of the same inclination, but by setting the second screen at a less incline the flow would be at about the same speed as over the upper screen, thereby securing uniform results. The material falling upon the next screen D would be still finer, and will therefore require a still less inclination of the screen to secure the retention of the material for the same length of time as upon the other screens. By this means a uniform action is secured, which is a very important feature of my invention. The decreasing distances between the screens toward the tail-ends is also a very important feature to secure the desired results, as all seeds, except the cockle and wheat, are thereby effectually separated out.

The shoe $C'$ is provided with a bottom board $C^5$, leaving an air-passage $C^6$ between the screens D and the bottom board, as shown. Beneath the shoe $C'$ is a stationary inclined frame $M'$, containing a stationary screen $M^2$ in its bottom and supporting an endless slatted belt $M^3$, the latter running over drums $M^4$ and $M^5$, as shown. The screen $M^2$ and the slatted belt $M^3$ are for the purpose of separating the cockle from the wheat. The perforations in the screen M² will be shorter than the length of a wheat-kernel, but long enough to permit the passage of the round cockle-seed. The inclination of the screen M² will be sufficiently acute to cause the material to flow over it by gravity, and the motion of the belt M³ will be sufficiently slow to retard the material to cause it to roll over and over and "bank up" behind the slats as they slowly pass downward over the screen, thus causing the longer wheat-berries to turn lengthwise across the perforation and pass over them, while the round cockle-seed will be precipitated to the surface of the screen by the tumbling and rolling motion and pass through the perforations, while the larger perfect berries of the wheat only pass over the tail of the screen. The presence of chaff, sticks, and larger kernels of other grains would prevent the proper coaction of the screen M² and slatted belt M³. Hence the importance of thoroughly separating such foreign matter from the perfect wheat before it reaches the screen. Therefore, as before stated, the peculiar form and construction of the screens D in the vibrating shoe C' and the close relations of the fan and the shoe are very essential and important features of my invention in properly preparing the wheat for the coactive action of the screens D and M² and the belt M³.

Another matter of advantage which I have gained in the present machine, when compared with that in my earlier patent, No. 389,002, lies in the fact that I now so connect together the fan, the shoe, and the lower separator that the feeding of the material from one part to another of its path can be accurately regulated. It will be understood that if the lower separator is worked to its fullest efficiency and capacity it must be fed (with respect to speed and quantity) in such way that it will be directly dependent upon the speeds of the fan and the shoe-screen and the quantity of material passing through the screens. In earlier constructions, such as that shown in my Patent No. 389,002, where the two separators were independent of each other, there was not the same correlation with respect to the speed of feed that is attainable in one of the present character. I herein provide a combined momentum and balancing mechanism, whereby there is uniformity in speed and the parts are so related that their speeds, respectively, shall be adapted one to the other. The wheel G² receives the power and initially drives the conveyer M³ and then in turn drives the fan by the speeding-up belt G⁴ and small pulley G⁵, and the latter drives the shoe by pitman F. If the conveyer is traveling slowly, there will be, as there should be, a corresponding reduction in the quantity of grain acted on by the screen and delivered from the shoe and a corresponding reduction in the speed of the fan, and vice versa. The two elements (the crank-wheel or fly-wheel and the fan) being directly connected coact to maintain a uniformity of speed and prevent sudden variations, the fan serving as a balance-wheel and the wheel G² as a momentum device. Hence after the parts have been once properly adjusted it is practically impossible to give too much load or too little load to the bottom separator, its load being automatically governed in the way described.

The adjustable feeding device will be varied according as the initial mass to be purified and graded contains more or less chaff and other foreign material and according to its condition, whether more or less moist or heavier or lighter, for it will be remembered that the lower supplemental separator acting through difference of shapes only is not affected by those conditions in which the wheat is initially found—that is to say, the lower separator will act the same if the wheat be moist and heavy that it will if it be dry and light, and also act the same whether it be originally mixed with a greater quantum of chaff and kindred foreign substances or with a lesser one. The desideratum is to deliver a constant and uniform stream of the wheat entirely irrespective of the condition in which it is initially received in the hopper, and by having the arrangement of screens above fully described I can gradually retard the wheat-kernels as they pass from screen to screen, and so adjust the feeding device as to deliver more or less to the initial stream to insure the delivery of the said uniform final stream.

I believe myself to be the first to have combined, with an overacting fan of the character shown and a screen-shoe near the top of the fan and receiving air horizontally from the top thereof, a supplemental separator acting through difference in shapes having a stationary screen and an endless continuously-traveling conveyer above the stationary screen, together with means for preventing the blasts of air from impinging on the grain after it reaches the lower supplemental separator, the latter having its upper end above the bottom of the fan and its receiving-point directly below the discharge of the aforesaid screen-shoe, the lower screen having a steep inclination and the retarding-conveyer being arranged close to the fan-drum or casing, and the first to have combined with two such correlated separators (one working with the joint actions of an air-blast and a screen and the other operating through differences in shape) means for automatically regulating the movements of all the parts of the said two separators, so that the feed of the material shall be properly adjusted, and I also believe myself to be the first to provide a grain-grading device having a series of superposed screens adapted to gradually retard the advance of the wheat and consisting of a reciprocating shoe containing such screens, the latter being arranged with gradually-increasing inclinations to the horizontal, together with a fan for supplying air-blasts to the spaces below the screens, a stationary hopper, and an adjustable feed device between the hopper and the initial screen, whereby the material can be fed in accordance with its varying character to the screens in such way as to have a substantially uniform stream of seeds finally delivered.

Having thus described my invention, what I claim as new is—

1. In a grain grading and separating machine, the combination of a stationary hopper, the lower separator adapted to separate seeds of one shape from seeds of another, the upper cleaning-separator comprising the fan, the reciprocating shoe, the series of superposed screens in the shoe, and the adjustable positively-acting, constantly-moving feeding mechanism between the hopper and the reciprocating screen, said parts being arranged substantially as set forth to supply a substantially constant stream of grain to the lower separator, as described.

2. In a grain grading and separating machine, the combination of the stationary hopper, the fan, and the lower separator adapted to separate grains or seeds of one shape from those of another, of the reciprocating shoe, the series of superposed screens in said shoe gradually increasing upward in their inclination to the horizontal, and the bottom board in said shoe arranged to collect the grain passing through all said screens and deliver it to the lower supplemental separator, substantially as set forth.

3. In a grain grading and separating machine, the combination of the lower separator adapted to separate grains of one shape from those of another, the overacting fan, the reciprocating shoe arranged to receive air from the upper part of said fan, and the series of superposed screens in said shoe increasing upward in their inclination to the horizontal, and all inclined outwardly downward from the horizontal, and the gathering board or chute at the bottom of the shoe below said screens and arranged to deliver the finally screened grain to the said lower separator, substantially as set forth.

4. In a grain separating and grading machine, the combination with the overacting fan having a cylindrical drum or casing cut away on a plane near the top and inclined to the vertical, of the reciprocating shoe fitted closely to the opening in the fan-casing and having its inner end inclined substantially parallel to the aforesaid plane, and a series of screens in the said shoe, arranged with their inner ends spaced apart and approximately close to the fan-blades and on lines approximately tangential to the circle of the fan-blades whereby the air-currents are caused to pass mainly lengthwise of and between the screens, substantially as set forth.

5. In a machine of the class described, for grading and separating grain, the combination of the frame, the fan mounted in said frame, the lower separator adapted to separate grains of one shape from those of another and containing an endless retarding-conveyer, a reciprocating shoe receiving air from the fan and having screening devices delivering directly to the lower separator, a driving mechanism connecting the said conveyer, fan and shoe, and providing a predetermined time relationship between the said parts, substantially as set forth.

6. In a grain grading and separating machine, the combination of the lower inclined stationary screen, the endless retarding-conveyer above the screen, the reciprocating shoe, the screening mechanism therein delivering directly to the lower separator, the fan adapted to deliver air to the shoe and connecting devices between the fan and the said conveyer whereby the fan also serves as a regulating device for the speed of the conveyer, and a power-transmitter for the shoe actuated by the said connecting devices, substantially as set forth.

7. In a grain grading and separating machine, the combination of the lower inclined stationary screen, the endless retarding-conveyer above the screen, the reciprocating shoe, the screening mechanism therein delivering directly to the lower separator, the fan adapted to deliver air to the shoe, the relatively slow speeded driving device connected to the retarding-conveyer, the speeding-up mechanism connecting the said driving device with the fan and a power-transmitter connecting the fan with the shoe, substantially as set forth.

In testimony whereof I have hereunto set my hand in the presence of two subscribing witnesses.

JOHN L. OWENS.

Witnesses:
C. N. WOODWARD,
ERIC NORTON.